(12) United States Patent
Brogan

(10) Patent No.: US 11,962,209 B2
(45) Date of Patent: Apr. 16, 2024

(54) AXIAL FLUX INDUCTION MOTOR OR GENERATOR

(71) Applicant: Roderick James Brogan, Littleton, CO (US)

(72) Inventor: Roderick James Brogan, Littleton, CO (US)

(73) Assignee: Torev Corporation, Washington, DC (US)

( * ) Notice: Subject to any disclaimer, the term of this patent is extended or adjusted under 35 U.S.C. 154(b) by 300 days.

(21) Appl. No.: 17/333,800

(22) Filed: May 28, 2021

(65) Prior Publication Data

US 2021/0288537 A1    Sep. 16, 2021

Related U.S. Application Data

(63) Continuation of application No. 16/366,740, filed on Mar. 27, 2019, now Pat. No. 11,031,835.

(51) Int. Cl.
| | | |
|---|---|---|
| *H02K 16/00* | (2006.01) | |
| *H02K 1/14* | (2006.01) | |
| *H02K 3/18* | (2006.01) | |
| *H02K 7/00* | (2006.01) | |
| *H02K 7/08* | (2006.01) | |
| *H02K 15/02* | (2006.01) | |
| *H02K 15/06* | (2006.01) | |

(Continued)

(52) U.S. Cl.
CPC ............ *H02K 3/18* (2013.01); *H02K 1/14* (2013.01); *H02K 7/003* (2013.01); *H02K 7/086* (2013.01); *H02K 15/022* (2013.01); *H02K 15/062* (2013.01); *H02K 17/12* (2013.01); *H02K 17/42* (2013.01)

(58) Field of Classification Search
CPC .......... H02K 16/00; H02K 16/04; H02K 1/24; H02K 1/2793; H02K 21/12
See application file for complete search history.

(56) References Cited

U.S. PATENT DOCUMENTS

| | | |
|---|---|---|
| 3,467,845 A | 9/1969 | Wesolowski |
| 5,440,185 A | 8/1995 | Allwine, Jr. |

(Continued)

FOREIGN PATENT DOCUMENTS

| | | |
|---|---|---|
| ES | 2 863 352 T3 | 10/2021 |
| WO | 2018/071044 A1 | 4/2018 |

OTHER PUBLICATIONS

Gruber, Stephen, "Response To Office Action Regarding U.S. Appl. No. 16/366,740", dated Dec. 4, 2020, pp. 13, Published in: US.

(Continued)

*Primary Examiner* — Dang D Le
(74) *Attorney, Agent, or Firm* — Neugeboren O'Dowd PC

(57) ABSTRACT

An axial flux induction machine including at least two stator and one rotor where the stators include an inner and outer ring of coils. The stator includes at least two mirrored structure constructed such as to secure wire coils, amplify magnetic characteristics, and provide a structure upon which to secure a rotary shaft or through which a rotary shaft may be run. The structures supporting either the outer or inner ring of coils can be in contact between the two stators and the outer ring can be spaced further from the rotary shaft than the inner ring of coils and also further from the rotary shaft than an outer edge of the rotor.

28 Claims, 15 Drawing Sheets

(51) Int. Cl.
  *H02K 17/12* (2006.01)
  *H02K 17/42* (2006.01)

(56) References Cited

U.S. PATENT DOCUMENTS

| | | | |
|---|---|---|---|
| 6,426,577 B1 * | 7/2002 | Sekiyama | H02K 7/09 |
| | | | 310/112 |
| 8,035,266 B2 | 10/2011 | Atarashi et al. | |
| 8,283,829 B2 | 10/2012 | Yamamoto et al. | |
| 8,760,023 B2 | 6/2014 | Calley et al. | |
| 8,884,491 B2 | 11/2014 | Kusase | |
| 9,071,118 B2 | 6/2015 | Takemoto et al. | |
| 9,236,773 B2 | 1/2016 | Janecek et al. | |
| 9,407,116 B2 | 8/2016 | Kondou et al. | |
| 9,692,267 B2 | 6/2017 | Tojima et al. | |
| 9,850,906 B2 | 12/2017 | Ozaki et al. | |
| 10,020,698 B2 | 7/2018 | Kondou et al. | |
| 10,122,223 B2 | 11/2018 | Takezaki et al. | |
| 10,320,268 B2 | 6/2019 | Chahine et al. | |
| 10,651,712 B2 | 5/2020 | Evans | |
| 10,727,712 B2 | 7/2020 | Schuler et al. | |
| 10,819,174 B2 | 10/2020 | Schuler et al. | |
| 10,931,154 B2 | 2/2021 | Masuda | |
| 10,971,959 B2 | 4/2021 | Mihaila et al. | |
| 11,031,835 B2 * | 6/2021 | Brogan | H02K 16/00 |
| 11,081,913 B2 | 8/2021 | Calley | |
| 11,171,526 B2 | 11/2021 | Hong et al. | |
| 11,394,266 B2 | 7/2022 | N et al. | |
| 11,431,209 B2 | 8/2022 | Mihaila et al. | |
| 11,581,762 B2 | 2/2023 | Gerbetz | |
| 11,594,929 B2 | 2/2023 | Yao et al. | |
| 2013/0169096 A1 | 7/2013 | Calley et al. | |
| 2018/0013336 A1 | 1/2018 | Li | |
| 2021/0143700 A1 | 5/2021 | Yao et al. | |
| 2021/0234418 A1 | 7/2021 | Mahajan et al. | |
| 2022/0158511 A1 | 5/2022 | Mihaila et al. | |
| 2022/0352799 A1 | 11/2022 | Nisida et al. | |
| 2023/0107792 A1 | 4/2023 | Desai et al. | |

OTHER PUBLICATIONS

Le, Dang D, "Office Action Regarding U.S. Appl. No. 16/366,740", dated Sep. 4, 2020, pp. 19, Published in: US.

Hincapie et al., "Axial Flux Electric Motor", Military University of New Granada Mechatronics Engineering, Feb. 20, 2018, pp. 27, Publisher: Retrieved from https://www.emworks.com/ckfinder/userfiles/files/Axial%20Flux%20Motor.pdf.

Moreels, Daan, "Axial Flux VS Radial Flux: 4 Reasons Why Axial Flux Machines Have a Higher Power Density", Jan. 31, 2018, pp. 4, Publisher: Retrieved from https://www.magnax.com/magnax-blog/axial-flux-vs-radial-flux.-4-reasons-why-does-axial-flux-machines-deliver-a-higher-power-density.

Brogan, Roderick, "DC Induction Motor", Jan. 31, 2017, pp. 12, Published in: US.

Gholamian, et al., "Effect of Air Gap On Torque Density for Double-Sided Axial Flux Slotted Permanent Magnet Motors Using Analytic and Fem Evaluation", Journal of Applied Sciences Research, Jan. 1, 2009, pp. 1230-1238, vol. 5, No. 9, Publisher: Retrieved from http://www.aensiweb.com/old/jasr/jasr/2009/1230-1238.pdf, Published in: US.

Brogan, Roderick, "Direct Current Induction Motor", Sep. 15, 2016, pp. 5, Published in: US.

Brogan, Roderick, "DC Induction Motor: An Analysis of Novel Electric Devices and Their Applications", Apr. 13, 2017, pp. 14, Published in: US.

Clemens, Kevin, "A New Generation of Axial Flux EV Motors", May 23, 2018, pp. 5, Publisher: Retrieved from https://www.magnax.com/magnax-blog/a-new-generation-of-axial-flux-ev-motors.

* cited by examiner

AXIAL FLUX INDUCTION MOTOR OR GENERATOR

CLAIM OF PRIORITY UNDER 35 U.S.C. § 120

The present Application for Patent is a Continuation of patent application Ser. No. 16/366,740 entitled "AXIAL FLUX INDUCTION MOTOR OR GENERATOR" filed Mar. 27, 2019, pending, and hereby expressly incorporated by reference herein.

FIELD OF THE DISCLOSURE

The present disclosure relates generally to an axial flux induction machine, specifically to an electric motor or generator that characterizes high performance through a more efficient magnetic circuit.

DESCRIPTION OF RELATED ART

The term "motor," used here, references any type of electrical machine capable of converting electrical energy to mechanical energy through magnetic interactions producing rotary motion on a shaft.

The term "generator," used here, references any type of electrical machine capable of converting mechanical energy to electrical energy through magnetic interactions produced by the rotary motion of a shaft.

An induction motor operates upon both Faraday's Law of Induction and Lenz's Law. A conductor experiencing a change in magnetic flux has a current induced therein. This induced current will produce a magnetic field, for instance, around the conductor as shown in FIG. 1. Within an induction motor, conductor coils are placed around a stationary body often comprised of high permeability magnetic material. This body and coil assembly are referred to as the stator of the motor. The stator coils of an induction motor are placed such as to produce a rotating magnetic field (RMF). This is achieved by separating the coils by 360/n, where n is the number of coil sets. The number of coil sets, n, should be a multiple of the phases. For example, in a three phase motor comprised of three coil sets, each coil set is offset by 120 degrees. The RMF produced by the coils is henceforth referred to as the stator field. The stator field interacts with a rotor consisting of a number of shorted conductive bars and a structure that is able to rotate around a common axis with the stator. As the stator field revolves about the axis, the conductive rotor bars experience a change in magnetic flux resulting in mechanical rotary motion in the same direction as the stator field. If a shaft is attached to the rotor and supported by a number of bearings, then the mechanical motion produced on the rotor by the stator field may be utilized to provide mechanical rotary energy to a system.

An induction generator operates on the same principles as described above. However, instead of transforming electrical energy to mechanical energy, it transforms mechanical energy into electrical energy. This is achieved by applying a brief excitation current to the stator structure, hence inducing a magnetic field on the rotor structure. If the rotor is then spun at a speed higher than the motor's synchronous speed, the rotary speed determined by the frequency of the machine, then the magnetic field of the rotor will act to induce an electric current within the stator of the motor. This current can then be utilized to power other electric devices.

An axial flux induction motor (AFIM), such as the one illustrated in FIG. 2, refers to a type of induction motor wherein the stator field rotates about the axial axis of the motor. One or more stator bodies produce a stator field that interacts with a rotor structure (e.g., bicycle wheel or permanent magnetic to name two). One or more bearings support a shaft which is directly attached to the rotor. This design generally reduces the overall volume of the motor over radial designs, resulting in higher power densities.

Three phase power operation refers to the utilization of three separate phases with equivalent frequency to produce torque on the rotor and thus rotation. To accomplish this, a number of coils are placed around the stator separated by 360/n (n being the number of coil sets and a multiple of the phases). This coil configuration produces a rotating magnetic field (RMF) when three electrical currents with 120 degree phase offset are applied to the coils. Each current is applied to the coil with the degree separation equivalent to the phase of the current. For example, a base coil, assumed to have a degree of 0, will have a pure sine wave current form applied to it. The next coil, assumed to have a degree of 120 degrees shifted from the base, will have a 120 degree phase shifted sine wave applied to it. The final coil, 240 degree shifted from the base, will have a 240 degree phase shifted sine wave applied to it. This configuration will produce a smooth RMF that can be utilized for mechanical power production through an electric motor. As the number of coil sets in the motor increases, the number of magnetic poles generated during operation increases proportionally. This is dictated by the formula $p=(2n)/3$, where p is the number of poles generated by the coils. Accordingly, a three phase motor comprised of three coil sets will produce a two pole rotating magnetic field. The number of poles within the motor is positive and even, as each north or south pole generated must also have a complimentary pole generated. These rotating poles interact with a conductive rotor to produce current within the rotor conductors through Faraday's Law of Induction. The produced current also produces a magnetic field, which interacts with the applied current according to Lorentz Force. This interaction will produce a magnetic force between the applied stator magnetic field and induced rotor field, thus causing the rotor structure to physically rotate and produce mechanical energy.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the current disclosure can be characterized as an axial flux induction machine comprised of a stator and rotor assembly. The stator core can be made from material capable of amplifying the magnetic field generated by the coils situated upon it. Such material is often referred to as high permeability material, due to having a high relative permeability. Two or more stator cores can be utilized in the herein-discussed embodiments. The number of rotors can be adjusted for the number of stator cores, such that the number of rotors can be one less than the number of stator cores. Where multiple generators or motors are combined, the number of rotors can be twice the number of stators. Other variations on the number of stators and rotors in also possible. The stator cores can be comprised of a disk with two rings of raised surfaces upon which a number of coils are situated. These surfaces may have a lip such as to secure the conductive coils in place (e.g., see FIG. 7), though this lip is not required. The coils may be separated by a degree determined by the number of phases utilized in operating the device. The coils can be arranged to overlap thereby providing a smoother rotating magnetic field and increase efficiency, possibly at the expense of cost, or to remain separate and result in cost savings while potentially sacrificing efficiency. The stator may also include an outer ring of raised portions upon which the coils can be wound. This outer ring may include a raised plateau below the coils as seen in FIG. 7. The inner and outer coils can be wound in opposing directions, and a single coil may be wound around a raised structure in the inner ring and a raised structure in the outer ring. The outer ring of raised portions may contact the outer ring of an opposing stator as shown in FIG. 9, while a small gap may be formed between opposing inner rings to leave room for the rotor. The rotor thickness may be minimized to reduce the air gap between inner rings on opposing stators. At the same time, this gap should be great enough to resist heat generated. The rotor can be secured to a shaft, and held in place by one or more bearings fitted in centrally located holes on both stators. The assembly may be held together by a supporting structure designed to prevent the stator plates from slipping apart while not under operation.

Other aspects of the current disclosure may include that the magnetic field of the stator structure can be designed to resemble that of a toroid. The toroid is an efficient electromagnetic shape, and the combination of upper lip coils and lower coils can work in tandem to produce a semi-toroidal field. This field may be stronger than that of related electrical machines, resulting in higher output efficiencies compared to similar devices. Due to the outer and inner coil arrangement, the inner coil field can be directed through the outer coils, producing a very tight, semi-toroidal magnetic field. By having inner and outer rings of coils where the outer ring of one stator contacts the outer ring of the opposing stator, the magnetic field only has to pass through air gaps between inner rings of opposing stators. Traditional axial motors entails four air gaps that the magnetic field passes through. The reduction in air gap space can result in a more efficient magnetic field characterized by minimized leakage flux. Furthermore, the inclusion of the outer ring of coils can reduce the overall size of the axial flux induction machine. Because the upper and lower coils can be configured to experience the same phase and exist on the same highly permeable surface, the outer coils may be seen as an extension of the inner coils. As such, the overall length of the axial flux induction machine can be reduced when compared to axial flux induction machines of similar power output, producing a higher power density while maintaining high efficiency performance.

Other aspects of the current disclosure can be characterized as an axial flux machine that also can act as a generator. After an excitation current is applied such as to produce a magnetic field on the rotor via preexisting methodologies, the rotor may be spun at above synchronous speed to produce a voltage across the stator coil windings. This induced stator voltage can then be fed back into the grid as useable generated power. Because of the semi-toroidal shape of the generator stator coils, the magnetic field induced in the stator structures by the rotor structure may interact with more coils, thus producing higher voltage at the output. This increased voltage may correspond with higher potential power output than traditional axial flux induction machines, thus improving power density and efficiency. The semi-toroidal shape also enables minimization of leakage flux from the generator, producing another efficiency advantage. This generator offers a number of advantages, primarily in the form of improved power density, which allows for the generator to be installed in smaller enclosures or harder to reach locations (e.g., the wheel of a car or the top of a wind turbine).

Some embodiments of the disclosure may be characterized as a flux induction machine. The machine can include an axis of rotation, a rotor, a shaft, and a first and second stator. The rotor can be centered around and configured to rotate around the axis of rotation. The shaft can pass through the axis of rotation and couple to the rotor thereby rotating when the rotor rotates. The first and second stators can each be centered around the axis of rotation. Each stator can include an inner and outer ring of high-permeability structures. The outer ring can be arranged further from the axis of rotation than the inner ring. The inner radius of the outer ring as measured from the axis of rotation can be greater than an outer radius of the rotor as measured from the axis of rotation. The stators can also include a plurality of conductive coils each coil wrapped around both: one or more of the structures in the inner ring; and one or more corresponding structures in the outer ring. Further, each coil can have at least two leads accessible from an exterior of the flux induction machine and can be configured for coupling to an electrical system. Corresponding ones of the outer ring of high-permeability structures between the two stators can be closer to each other measured axially than corresponding ones of the inner ring of high-permeability structures between the two stators measured axially.

Other embodiments of the disclosure may also be characterized as a flux induction machine including an axis of rotation, a rotor, a shaft, and first and second stators. The rotor can be centered around and configured to rotate around the axis of rotation. The shaft can pass through the axis of rotation and be coupled to the rotor thereby rotating when the rotor rotates. The first and second stators can be centered around the axis of rotation and can include an inner means for retaining first portions of one or more conductive coils. The stators can also include an outer means for retaining second portions of the one or more conductive coils. The outer means can be arranged further from the axis of rotation than the inner means. Each of the conductive coils can be wrapped around both: one or more structures of the inner means; and one or more corresponding structures of the outer means. Each of the one or more conductive coils can have two leads accessible from an exterior of the flux induction machine and configured for coupling to an electrical system.

Other embodiments of the disclosure can be characterized as a method of manufacturing a flux induction machine. The method can include forming a rotor and forming a first and second stator. Each stator can include an inner ring of high-permeability structures that extends axially from the first or second stator toward the rotor. Each stator can also include an outer ring of high-permeability structures arranged a radial distance outside the inner ring, and that extends axially from the first or second stator toward the rotor. The method can further include wrapping each of one or more conductive coils around at least one of the structures on the inner ring and one of the structures on the outer ring of the first or second stator leaving two leads. The method can further include wrapping each of one or more conductive coils around at least one of the structures on the inner ring and one of the structures on the outer ring of the second stator leaving two more leads. The method can further include forming a shaft and affixing the rotor to the shaft. The method can yet further include rotatably coupling the first stator and the second stator to the shaft. The leads can be accessible from outside the induction flux machine once the rotor and two stators are coupled to the shaft.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 14 shows an example of an external side view of two stacked axial flux induction machine structures with a gap between.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1:
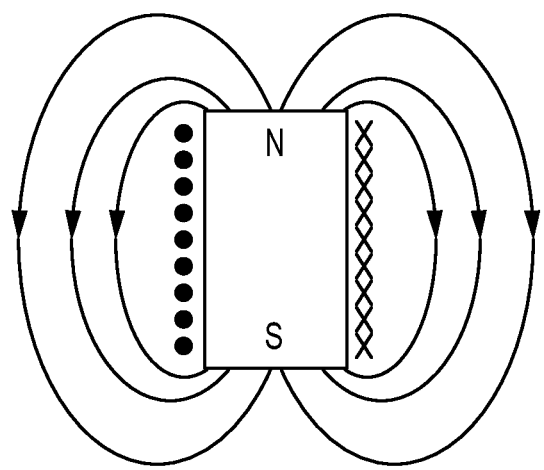
FIG. 1 shows an example of an electrical coil producing a magnetic field.
Figure 2:
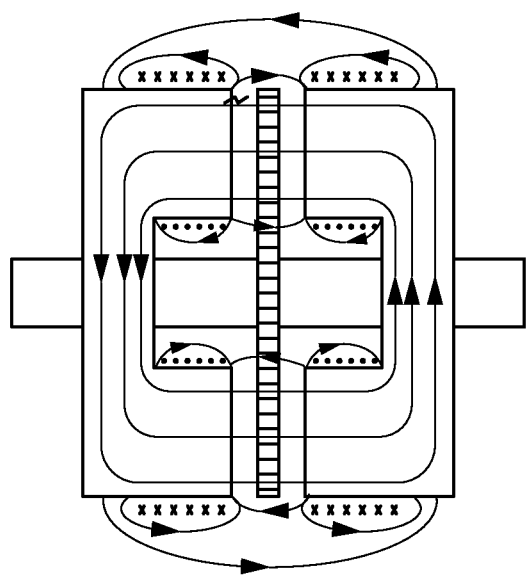
FIG. 2 shows an example of a cross-sectional view of a traditional axial flux induction machine with magnetic field lines.
Figure 3:
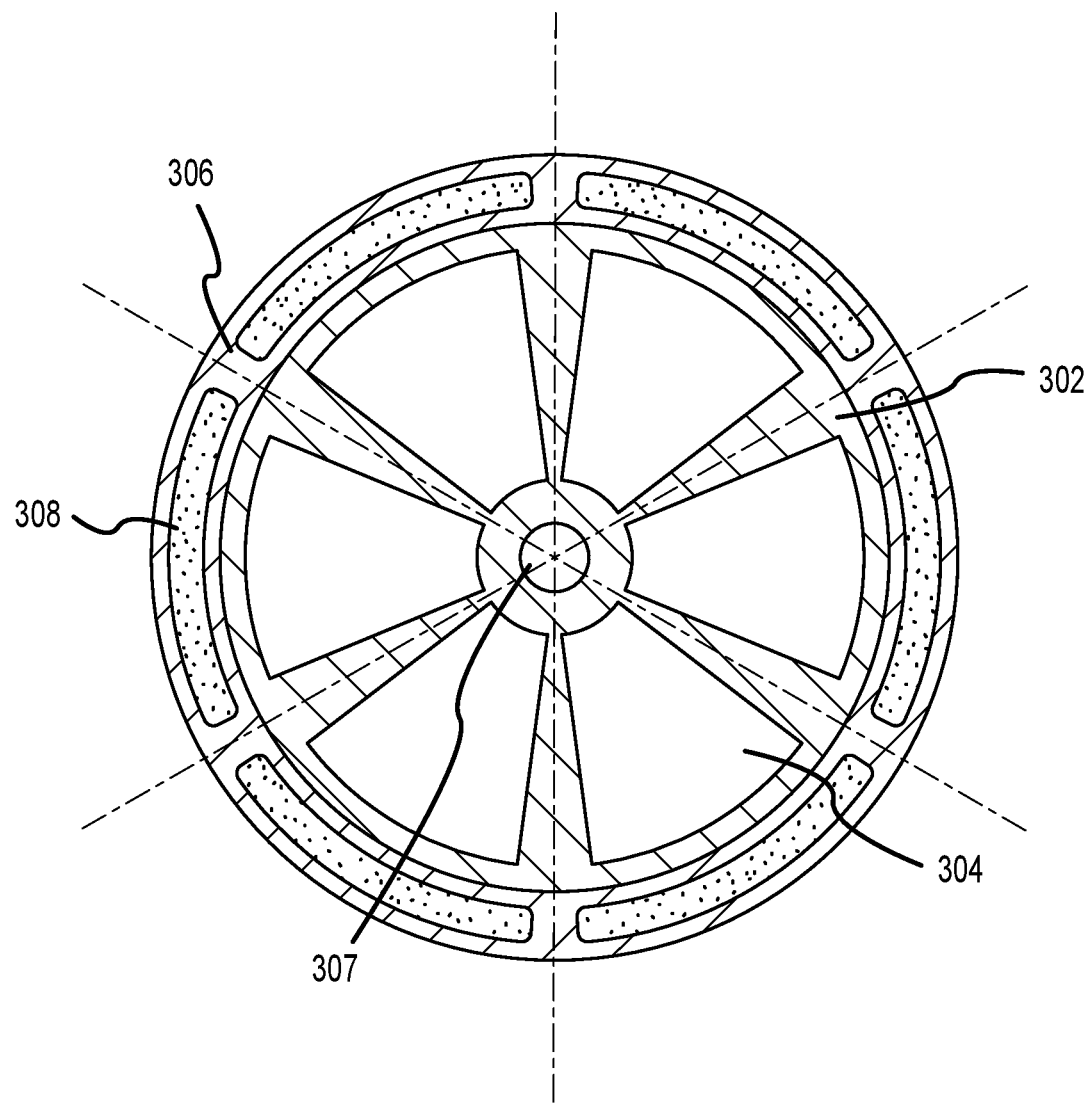
FIG. 3 shows an example of a coil mounting side of a single stator core of an embodiment of this disclosure.

FIG. 3 illustrates one embodiment of the present disclosure with a stator that has an inner and outer ring of high-permeability structures. Shown is the coil mounting side of the stator, and in this embodiment, it is configured for three-phase power operation; however, other embodiments may be configured to accommodate any number of phases by, for example, adjusting the number of coil sets and support structures in the inner and outer ring. The stator has a core base 302 (see also 702 in FIG. 7), that may be formed of a high-permeability material, with a circular cross-sectional area upon which all supporting structures reside. The circular cross-sectional area may vary in other embodiments. Protruding from the core base 302 is an inner ring of high-permeability structures 304 configured to mount and secure coils (see also 704 in FIG. 7). These wedge-shaped inner ring structures 304 may be adjusted for a variable number of magnetic poles, power phases, and field intensities by, for example, increasing or decreasing the wedge angle or varying the number of structures 304. Additionally, the protrusion height and thickness of the inner ring structures 304 can be adjusted to accommodate different sizes of coils, which may vary according to power requirements. Height of a structure 304 is measured vertically in FIG. 7. Optionally, the inner ring structures 304 may have an upper lip that enables them to further secure coils in place. Each inner ring structure 304 may provide support for a single coil or a layered coil model.

Optionally, the outer circumference of the core base 302 can include a raise structure 306 (see also 706 in FIG. 7), which may have a curved or angled edge. This raised structure 306 may be formed from a high-permeability material and may be formed form a unified material with the base 302. This raised lip 306 acts as a base for the outer ring of highly-permeable structures 308 and may be used to efficiently transfer magnetic flux between the coils of the inner ring structures 304 and outer ring structures 308; however, in some embodiments this raised lip 306 may not be present, allowing the outer ring structures 308 to rest directly on the core base 302. In such a case, the outer coils and outer ring structures 308 would have a greater height than the inner coils and inner ring structures 304. The outer ring structures 308 can protrude from the raised lip 306 and are configured to mount and secure coils. These outer ring structures 308 may be adjusted for a variable number of magnetic poles and power phases by, for example, varying the number of structures. Additionally, the protrusion height and thickness of the outer ring structures 308 can be adjusted to accommodate different sizes of coils, which may vary according to power requirements; however, in some embodiments, the outer ring structures 308 protrude further than the inner ring structures 304. Optionally, the outer ring structures 308 may have an upper lip that enables them to further secure coils in place. The stator has a central hole 307 through which a rotational shaft can pass.

Figure 4:
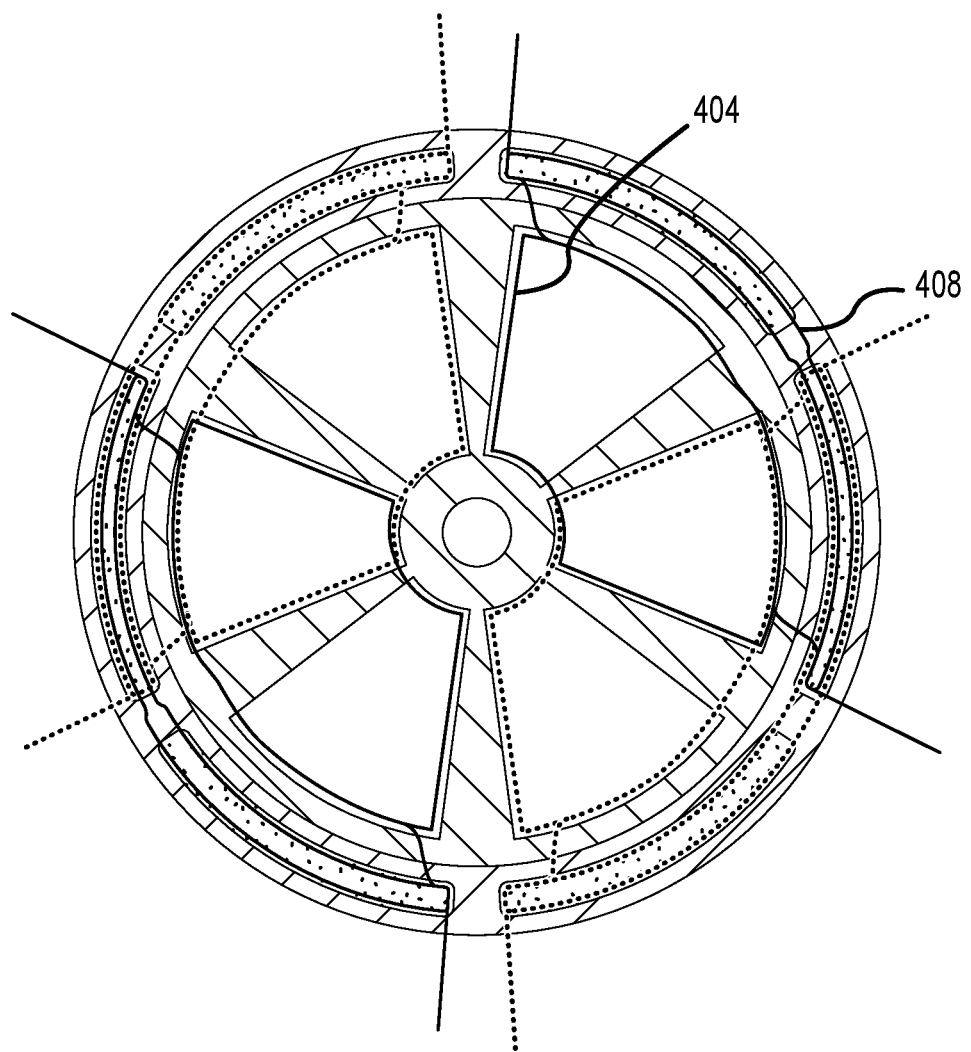
FIG. 4 shows an example of a three-phase wire configuration for a stator of an axial flux induction machine.

The three-phase power operation of the FIG. 3 embodiment can be achieved using a wire configuration with overlapping conductive coils such as shown in FIG. 4, although other wire configurations may be used. In FIG. 4, the primary coils are separated by 120 degrees, with inverted coils of equivalent phase separated from a primary coil by 60 degrees. Such a design would produce a four-pole RMF. The inner conductive coils 404 are all wrapped around the inner ring structures 304, while the outer conductive coils 408 are all wrapped around the outer ring structures 308. In an embodiment, one inner conductive coil 404 can be electrically coupled to one outer conductive coil 408 to form a single conductor. The magnetic field generated by the inner coils 404 is rotational, equal in phase, and opposite in polarity to the magnetic field generated by the outer coils 408. In other embodiments, the number of coils can vary to achieve a specific number of poles or power phases, and the coils may or may not overlap.

In some embodiments, an inner coil 404 can be conductively coupled to an outer coil 408 via either a series or parallel connection to form a single conductive path. The single conductive path may have two leads accessible from the axial flux induction machine exterior and be configured for coupling to an electrical system (e.g., a power source, battery, the grid, etc).

Figure 5:
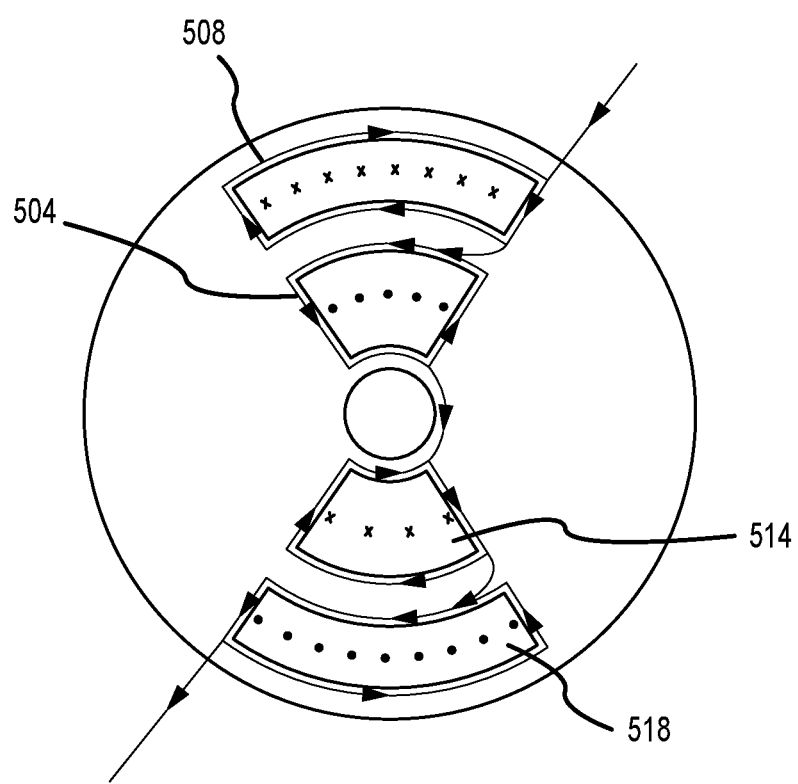
FIG. 5 shows an example of a serial winding connection for four of the coils of an axial flux induction machine (the additional coils are not shown).
Figure 6:
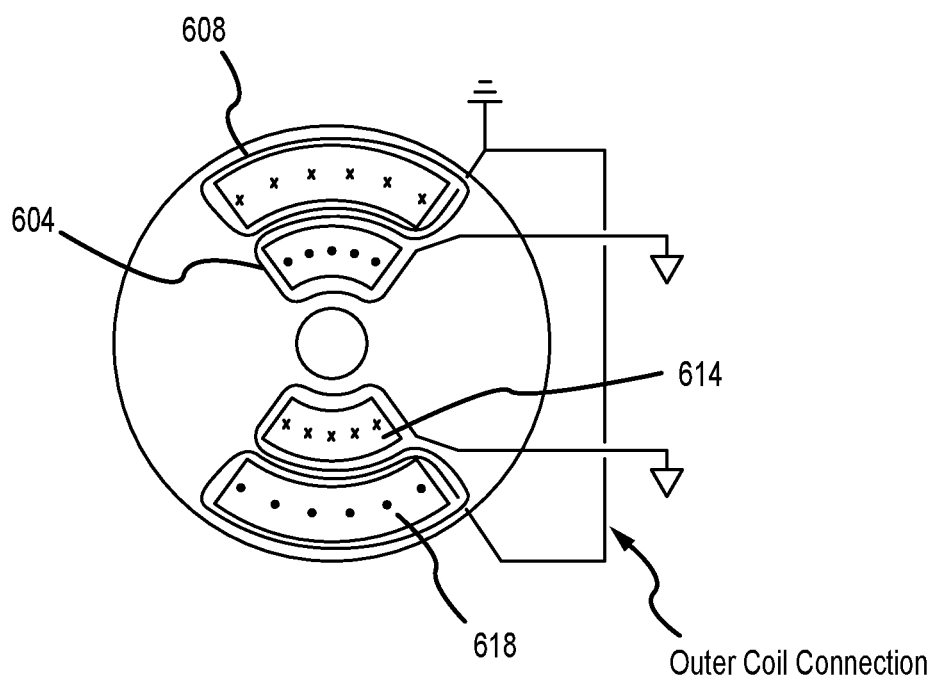
FIG. 6 shows an example of a parallel winding connection for four of the coils of an axial flux induction machine.

FIG. 5 illustrates an embodiment of pairs of inner and outer coils 504 and 508, respectively, being coupled in series. As seen in FIG. 5, the inner coils 504 are wrapped around inner ring structures 514, while the outer coils 508 are wrapped around outer ring structures 518. FIG. 6 illustrates an embodiment of pairs of inner and outer coils 604 and 608, respectively, being coupled in parallel. In FIG. 6, the inner coils 604 are wrapped around inner ring structures 614, while the outer coils 608 are wrapped around outer ring structures 618. In both cases, the single conductive path that is formed for all four coils allows multiple coils to be powered by a single power source, which can then uniformly control the power phase of the connected coils.

Figure 7:
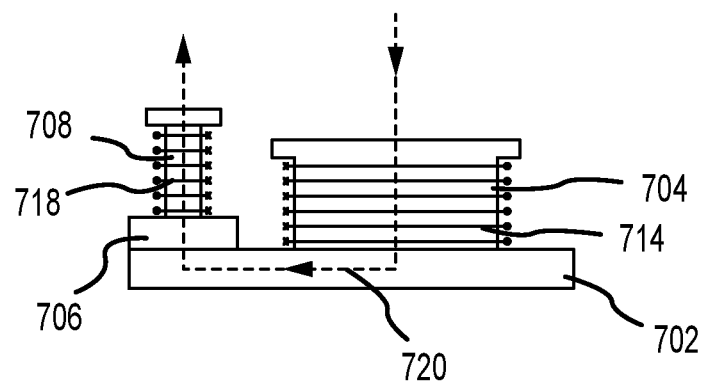
FIG. 7 shows a cross-sectional view of an embodiment of a stator core, with coils, of an axial flux induction machine.

Referring next to FIG. 7, in some embodiments, the inner coils 714 and the outer coils 718 can be wound around the inner ring structures 704 and the outer ring structures 708 in different configurations to achieve different magnetic field paths 720. Shown is a cross-sectional view of a section of a stator with the coil mounting side facing upward. The inner coils 714 are wrapped in the opposite direction of the outer coils 718 to achieve the magnetic field path 720, which can be used in forming semi-toroidal magnetic field loops. In some embodiments, the inner coils 714 may be wider than the outer coils 718 to enable the inner coils 714 to produce a higher magnetic field density. The inner ring structure 704 protrudes from the stator base 702, while the outer ring structure 708 protrudes from the raised lip 706, which may have a curved or angled edge. In some embodiments, this raised lip 706 may not be present, and the outer ring structure 708 may protrude directly from the stator base 702. The protrusion height and thickness of the inner ring structure 704 and outer ring structure 708 can be adjusted to accommodate different sizes of coils, which may vary according to power requirements; however, the overall protrusion height of the outer ring structure 708 is greater than the protrusion height of the inner ring structure 704 in some embodiments. The inner ring structure 704 and outer ring structure 708 have an upper lip that enables them to further secure coils in place, but this lip may not be present in other embodiments. Also, the inner ring structure 704 and outer ring structure 708 may provide support for a single coil or a layered coil model. Furthermore, the stator core base 702, inner ring structure 704, outer ring structure 708, and raised lip 706 may be constructed of one of more high-permeability materials, which enables the amplification of the magnetic field produced by the inner ring coils 714 and outer ring coils 718 while producing the magnetic field path 720.

Figure 8:
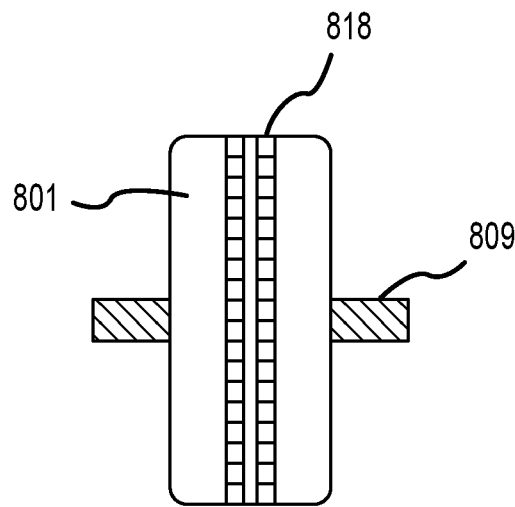
FIG. 8 shows an example of an external side view of a single completed axial flux induction machine having two stators and one rotor.

FIG. 8 illustrates an embodiment of the present disclosure viewed from the exterior. Shown is a single completed axial flux induction machine that contains two stator cores 801 and a rotor (not visible since covered by the outer ring coils 818). The outer ring coils 818 of the two stator cores 801 are visible along the middle section of the axial flux induction machine exterior. A shaft 809 passes through the axial flux induction machine along an axis of rotation and is configured for rotation.

Figure 9:
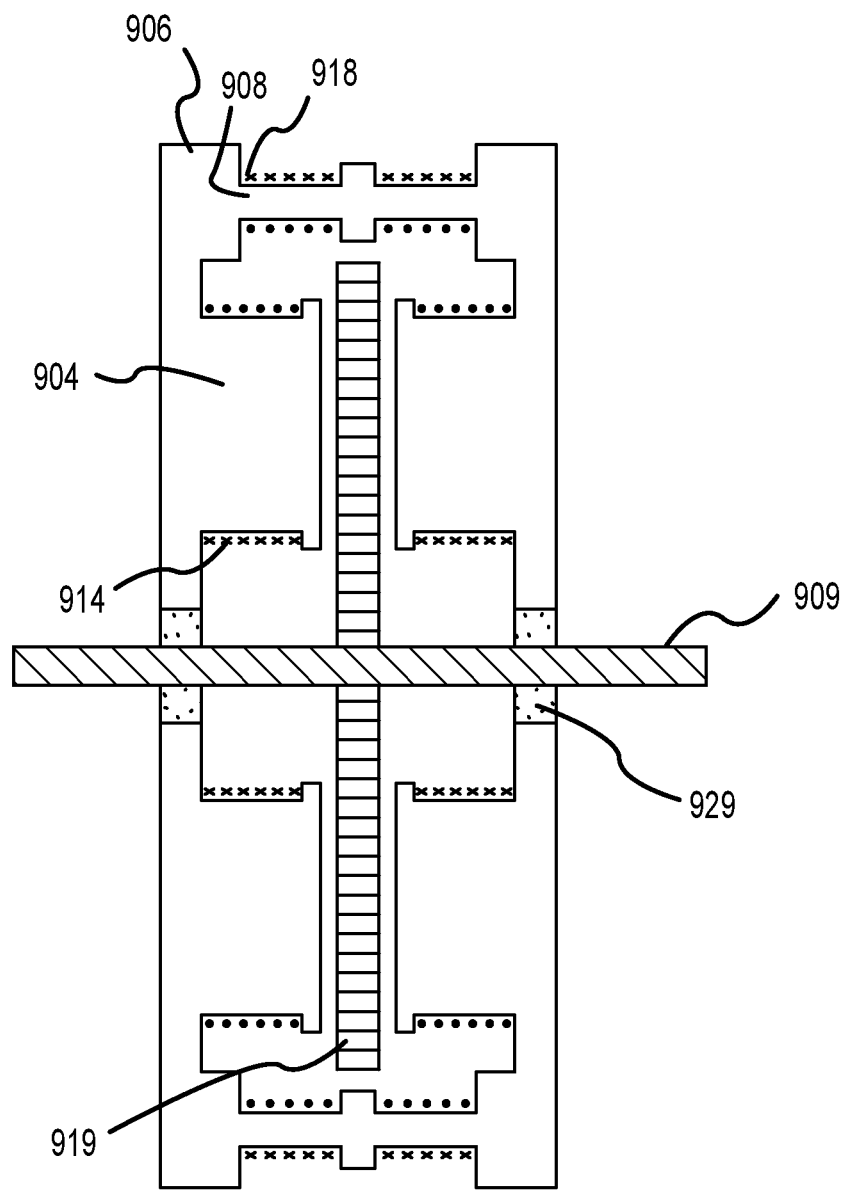
FIG. 9 shows an example of a cross-sectional view of a single completed axial flux induction machine having two stators and one rotor.

FIG. 9 illustrates an embodiment of the present disclosure with a cross-sectional view. Specifically, the interior of a single completed axial flux induction machine with two stators is shown. The two stators may be coupled together at the outer ring and are centered around an axis of rotation through which a shaft 909 passes. Although not shown, in some embodiments, a gap or short distance may separate the outer rings of the two stators. A rotor 919 is centered around and configured to rotate about this axis of rotation, and the shaft 909 is coupled to the rotor 919 to, thereby, rotate when the rotor 919 rotates. Each stator may be coupled to the shaft via one or more bearings 929, which may be constructed of low-permeability material (e.g., ceramic) to avoid magnetic field interactions that may cause additional friction; however, in other embodiments the stators may not be directly coupled to the shaft. Alternatively, a barrier layer of low-permeability material (e.g., ceramic) can be included between each stator and its respective bearing. Alternatively, the bearings 929 can be shifted along the shaft 909 to separate them from the stators. In some embodiments the shaft 909 may be constructed of low-permeability material, avoiding possible interference with the axial flux induction machine performance.

In FIG. 9, each stator has an inner ring of high-permeability structures 904 and an outer ring of high-permeability structures 908, which are arranged further from the axis of rotation and the shaft 909 than the inner ring of high-permeability structures 904. The inner coils 914 are wrapped around the inner ring structures 904, and the outer coils 918 are wrapped around the outer ring structures. The inner ring structures 904 protrude from each stator core base 902 toward the rotor and the opposing stator, while the outer ring structures 908 protrude from a raised lip 906, which may have a curved or angled edge. In some embodiments, the raised lip 906 may not be present, and the outer ring structures 908 may protrude directly from each stator core base 902. The protrusion height and thickness of the inner ring structures 904 and outer ring structures 908 can be adjusted to accommodate different sizes of coils, which may vary according to power requirements. Space is left between the rotor 919 and the stator structures to enable the rotor to rotate without introducing additional friction. The distance, measured axially, between the outer ring of high-permeability structures 908 on the two stators is less than the distance between the inner ring of high-permeability structures 904.

In some embodiments, the distance between the outer ring of structures 908 may be non-zero but still less than the distance between the inner ring of structures 904. In the illustrated embodiment, there is no distance or gap between the outer rings 908. The outer ring structures 908 have an inner radius as measured from the rotation axis that is greater than an outer radius of the rotor 919. However, in other embodiments where there is a gap between the outer ring structures 908 of opposing stators, the outer ring structures 908 may have an inner radius that is less than an outer radius of the rotor, but an outer radius that is greater than an outer radius of the rotor.

The inner ring structures 904 and outer ring structures 908 have an upper lip that enables them to further secure coils in place, but this lip may not be present in other embodiments. Also, the inner ring structures 904 and outer ring structures 908 may each provide support for a single coil or a layered coil model. Furthermore, each stator core base 902, inner ring structure 904, outer ring structure 908, and raised lip 906 may be constructed of one of more high-permeability materials, which enables the amplification of the magnetic field produced by the inner ring coils 914 and outer ring coils 918 while producing the magnetic field path 920. In some embodiments, the inner coils 914 and outer coils 918 wrapped around corresponding inner ring structures 904 and outer ring structures 908 can be conductively coupled, at least one of in series or in parallel, to form a single conductive path (e.g., see FIGS. 5 and 6). The single conductive path may have two leads accessible from the axial flux induction machine exterior after assembly thereby enabling coupling to an electrical system such as a power source, battery, transformer, A-D or D-A converter, the grid, etc. For instance, FIG. 5 shows inner and outer coils 504 and 508, respectively, coupled in series to form a single conductive path. Additionally, FIG. 6 shows inner and outer coils 604 and 608, respectively, coupled in parallel to form a single conductive path.

Figure 10:
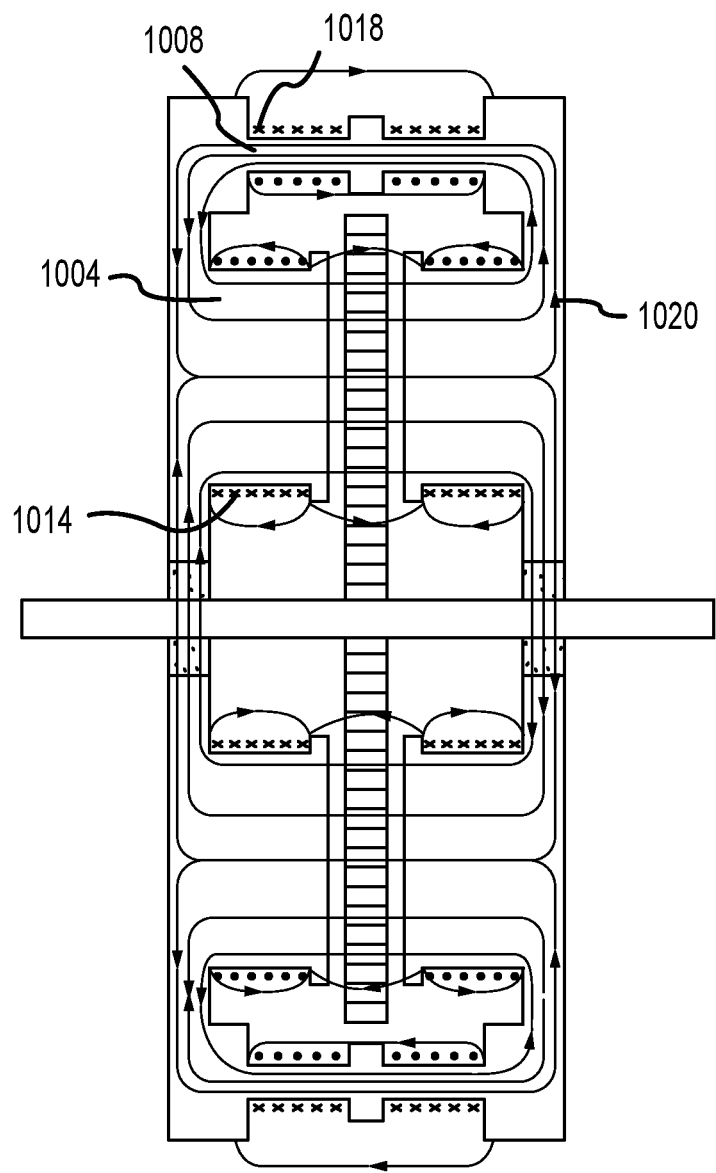
FIG. 10 shows the magnetic field lines for the structure of FIG. 9.

FIG. 10 illustrates an example of a more detailed view of the magnetic field paths of the FIG. 9 embodiment. In some embodiments, the inner coils 1014 and the outer coils 1018 can be wound around the inner ring structures 1004 and the outer ring structures 1008, respectively in different configurations to achieve different magnetic field paths 1020. In some embodiments, the inner coils 1014 may be wider than the outer coils 1018 to enable the inner coils 1014 to produce a higher magnetic field density. The inner coils 1014 can be wrapped in the opposite direction of the corresponding outer coils 1018 of each stator to achieve the magnetic field path 1020, which can form a semi-toroidal magnetic field configuration. This semi-toroidal magnetic field configuration enables the axial flux induction machine to operate more efficiently with a stronger magnetic field for a given amount of power than known axial motors and generators. Additionally, the majority of the magnetic field path 1020 may only experience air gaps (e.g., 2) when passing between inner ring structures 1004 of opposing stators, whereas traditional axial systems require the field to pass through twice as many air gaps (e.g., 4). Reducing the number and distance of air that the field has to pass through results in a more efficient magnetic field characterized by minimized leakage flux. The efficiency benefits of the herein-disclosed semi-toroidal magnetic field configuration and the reduced gap space enable the axial flux induction machine to have a reduced size for a given operating power.

Figure 11:
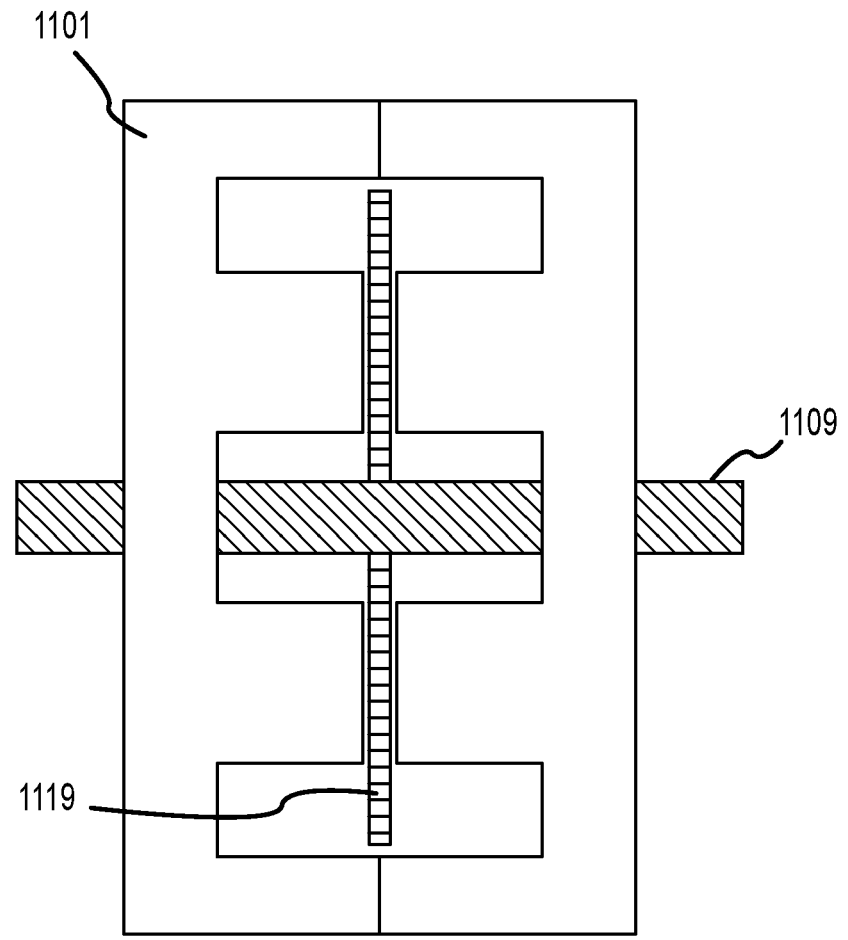
FIG. 11 shows an example of a single completed axial flux induction machine with sharp edges.

FIG. 11 illustrates an example of an embodiment of the present disclosure where the axial flux induction machine has sharp edges. Shown is a single completed axial flux induction machine that contains two stator cores 1101. A shaft 1109 passes through the axis of rotation and is coupled to the rotor 1119 to thereby rotate when the shaft 1109 rotates. The exterior and interior edges of the axial flux induction machine are relatively sharp with well-defined corners (e.g., corners having small radii of curvature).

Figure 12:
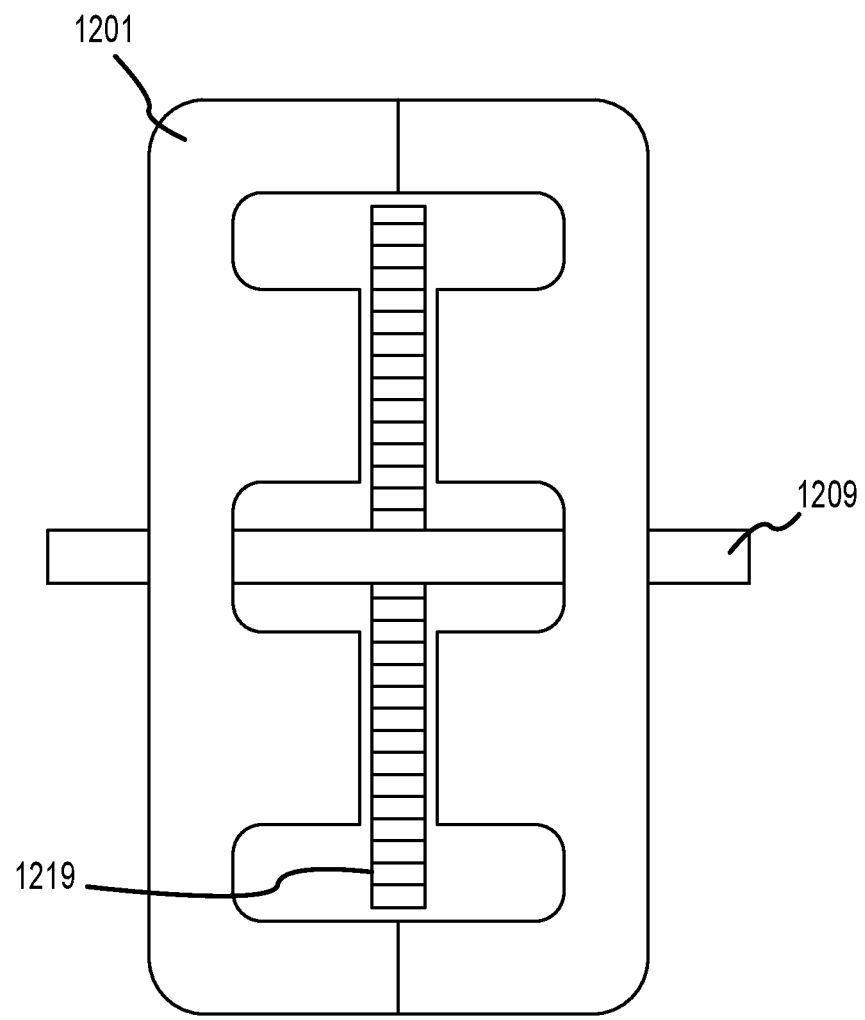
FIG. 12 shows an example of a single completed axial flux induction machine with at least some rounded edges.

In other embodiments, such as the embodiment illustrated in FIG. 12, the edges of the axial flux induction machine may be rounded. FIG. 12 shows a single completed axial flux induction machine that contains two stator cores 1201 and a rotor 1219. A shaft 1209 passes through the axial flux induction machine along an axis of rotation and is configured for rotation. A rotor 1219 is centered around and configured to rotate about this axis of rotation, and the shaft 1209 is coupled to the rotor 1219 to, thereby, rotate when the rotor 1219 rotates. The exterior and interior edges of the axial flux induction machine are rounded (e.g., having a relatively large radii of curvature), which enables the stator cores 1201 to be more aligned with the semi-toroidal magnetic field present in some embodiments of the present disclosure. Greater alignment of the stator cores 1201 with the magnetic field may provide greater overall efficiency of the machine.

Figure 13:
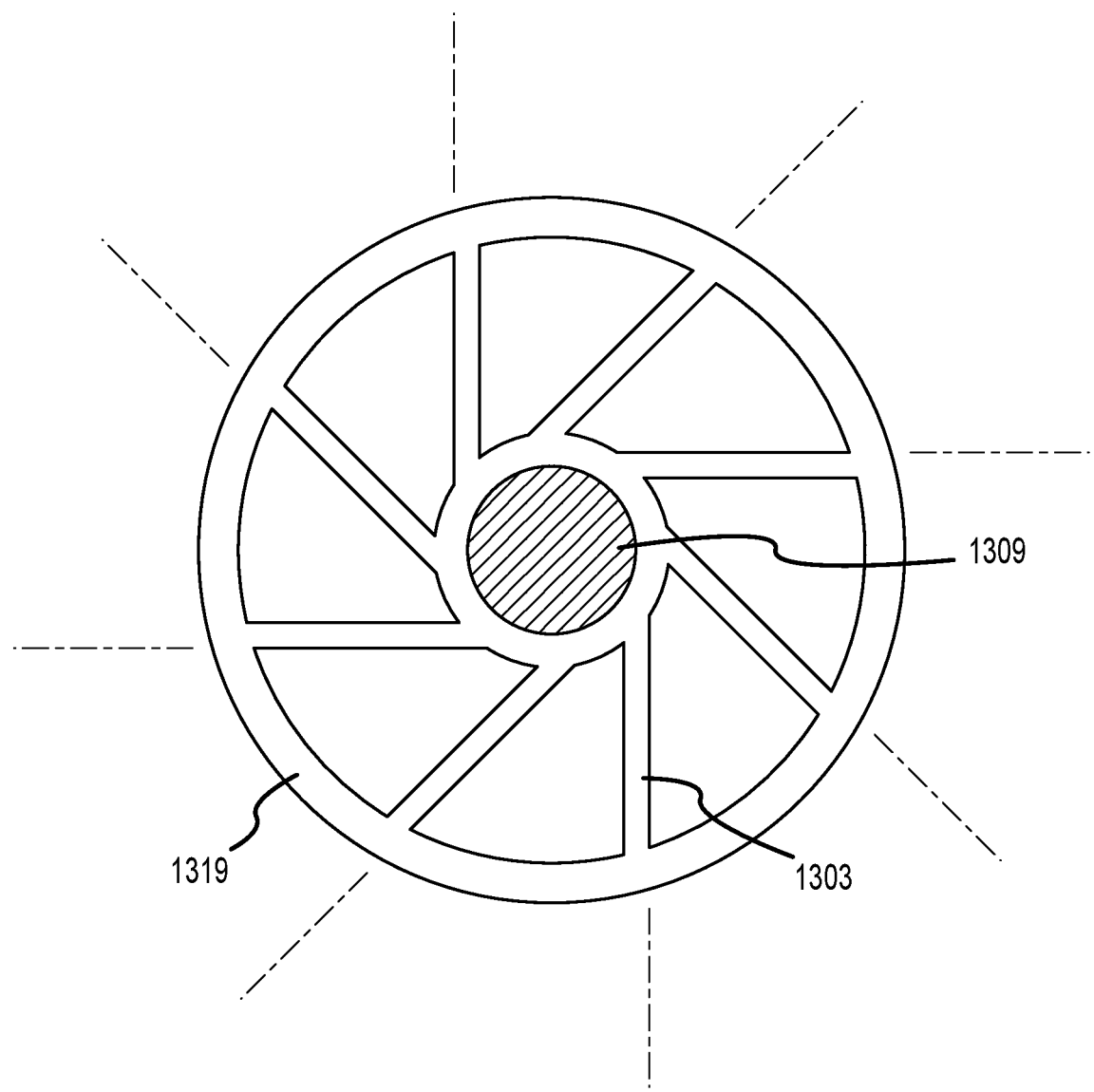
FIG. 13 shows an example of a rotor and attached shaft.

FIG. 13 illustrates an example of a rotor that may be used in some embodiments of the present disclosure. The rotor 1319 is centered around and configured to rotate about an axis of rotation, and a shaft 1309 is coupled to the rotor 1319 to, thereby, rotate when the rotor 1319 rotates. The rotor 1319 can have two concentric rings, as shown, with a plurality of rotor bars 1303 connecting the inner ring to the outer ring. The number and shape of the rotor bars 1303 may vary in other embodiments. The rotor bars 1303 shown are skewed at a 45 degree angle from their center line tangent. In other embodiments, the rotor bars 1303 may be skewed at different angles or not at all; however, skewing the rotor bars 1303 may enable the rotor 1319 to operate more efficiently. The rotor 1319 may be constructed of one or more conductors and may also be constructed of one of more high-permeability materials, which enables the amplification of magnetic field intensity. However, one of skill in the art will recognize that other rotor configurations (e.g., permanent magnet) can also be implemented without significant change to the rotor designs disclosed herein.

Figure 14:
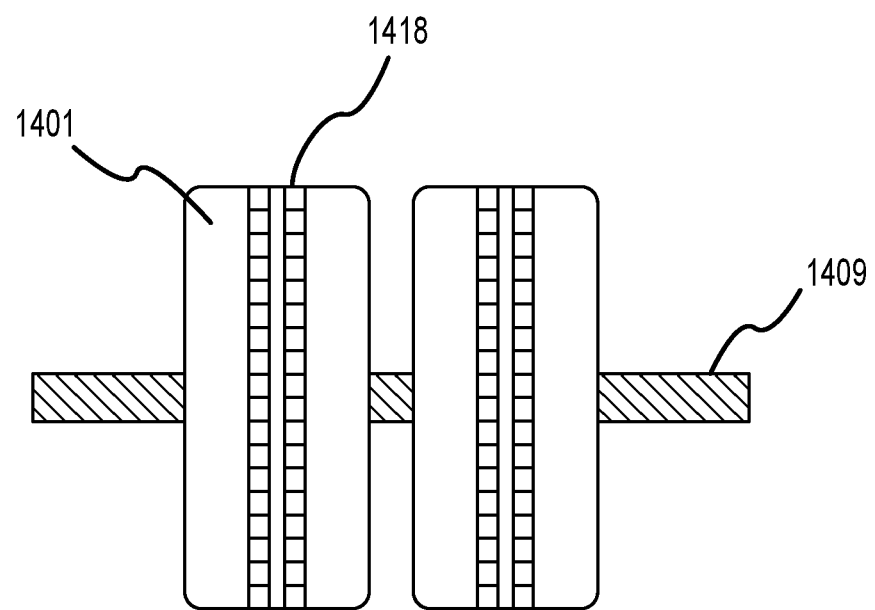
Figure 15:
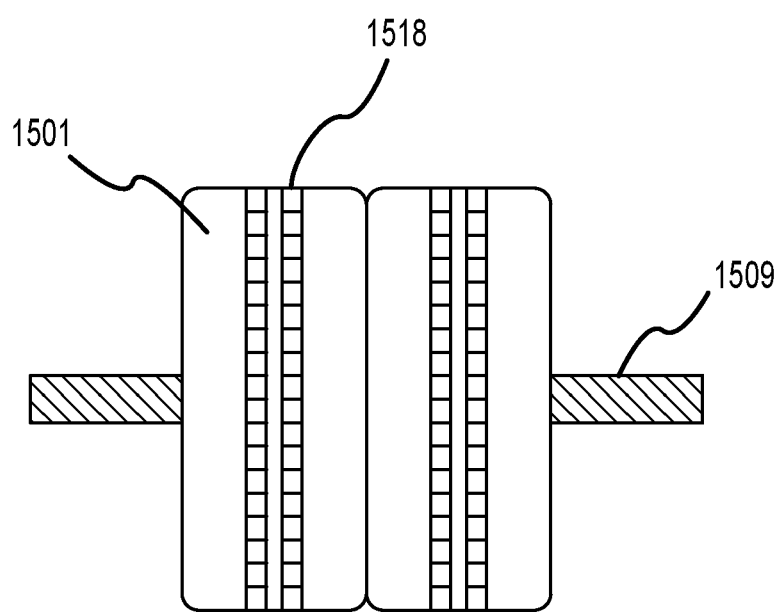
FIG. 15 shows an example of an external side view of a two stacked, abutting axial flux induction machine structures.

In some embodiments, a plurality of axial flux induction machines may be stacked along a single shaft with gaps between each of the axial flux induction machines, such as in the embodiment illustrated in FIG. 14 (or without gaps as seen in FIG. 15). Stacking without gaps can produce higher efficiency in a smaller volume, but sometimes design stipulations suggest a preference for gaps. Shown in FIG. 14 is an external view of two axial flux induction machines stacked along a single shaft 1409 with a gap between them. Each axial flux induction machine contains two stator cores 1401. The outer ring coils 1418 of each stator core 1401 are visible along the middle section of each axial flux induction machine exterior. The shaft 1409 passes through the axial flux induction machines along an axis of rotation and is configured for rotation. The coils of the two axial flux induction machines may be inverted to enable the production of repulsive magnetic forces between the poles of each structure. Such an orientation enables greater magnetic field containment and reduces the risk of magnetic flux leakage.

In other embodiments, a plurality of axial flux induction machines may be stacked along a single shaft without a gap between axial flux induction machines, such as in the embodiment illustrated in FIG. 15. Shown in FIG. 15 is an external view of two axial flux induction machine structures stacked along a single shaft 1509. The two axial flux induction machine structures are abutting each other with no gap between and may contain three stator cores 1501, where abutting stator cores 1501 have been merged. In other embodiments, the stator cores 1501 may not be merged, maintaining the number of stator cores 1501 present prior to stacking. The outer ring coils 1518 of each stator core 1501 are visible along the middle section of each axial flux induction machine exterior. The shaft 1509 passes through the axial flux induction machines along an axis of rotation and is configured for rotation. Although, FIG. 15 only shows two stacked axial flux induction machine structures, in other embodiments, a greater number of abutting axial flux induction machine structures may be stacked along a single shaft. The stacking of a plurality of axial flux induction machines along a single shaft allows for scaling into higher power applications that may exceed the capacity of a single axial flux induction machine. In some embodiments, abutting axial flux induction machine structures can be coupled to form a single structure. An advantage of coupling abutting axial flux induction machine structures is that the stator cores of the abutting sides may each be merged into a single stator core, which shares the magnetic fields of the abutting axial flux induction machines. This merging of abutting stator cores enables a reduction of the overall number of stator cores, potentially reducing the overall size of the coupled axial flux induction machines, and enables the magnetic fields of abutting machines to interact more closely, which may improve overall efficiency.

Figure 17:
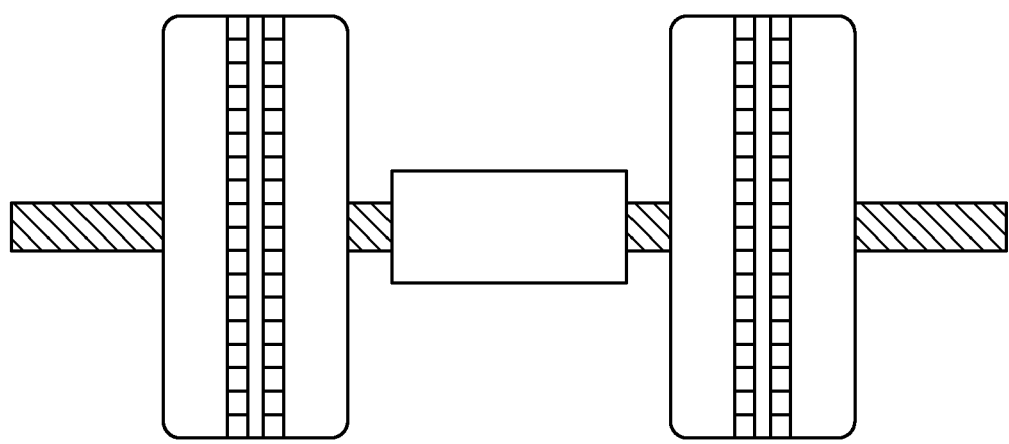
FIG. 17 shows an embodiment of an axial flux induction machine having two axial machines stacked on the same shaft along with a traditional radial induction machine arranged between the two axial flux induction machines.

Although only two machines are shown in FIGS. 14 and 15, in other embodiments, three or more stacked machines can be implemented. Further, a traditional radial induction machine can be arranged between any pair of axial induction flux machines as shown in FIG. 17. For instance, one axial induction flux machine can be arranged within the wheel or wheel well of a car on both ends of an axel with a traditional radial induction machine arranged in a middle of the axel bisecting or roughly bisecting the axel.

Figure 16:
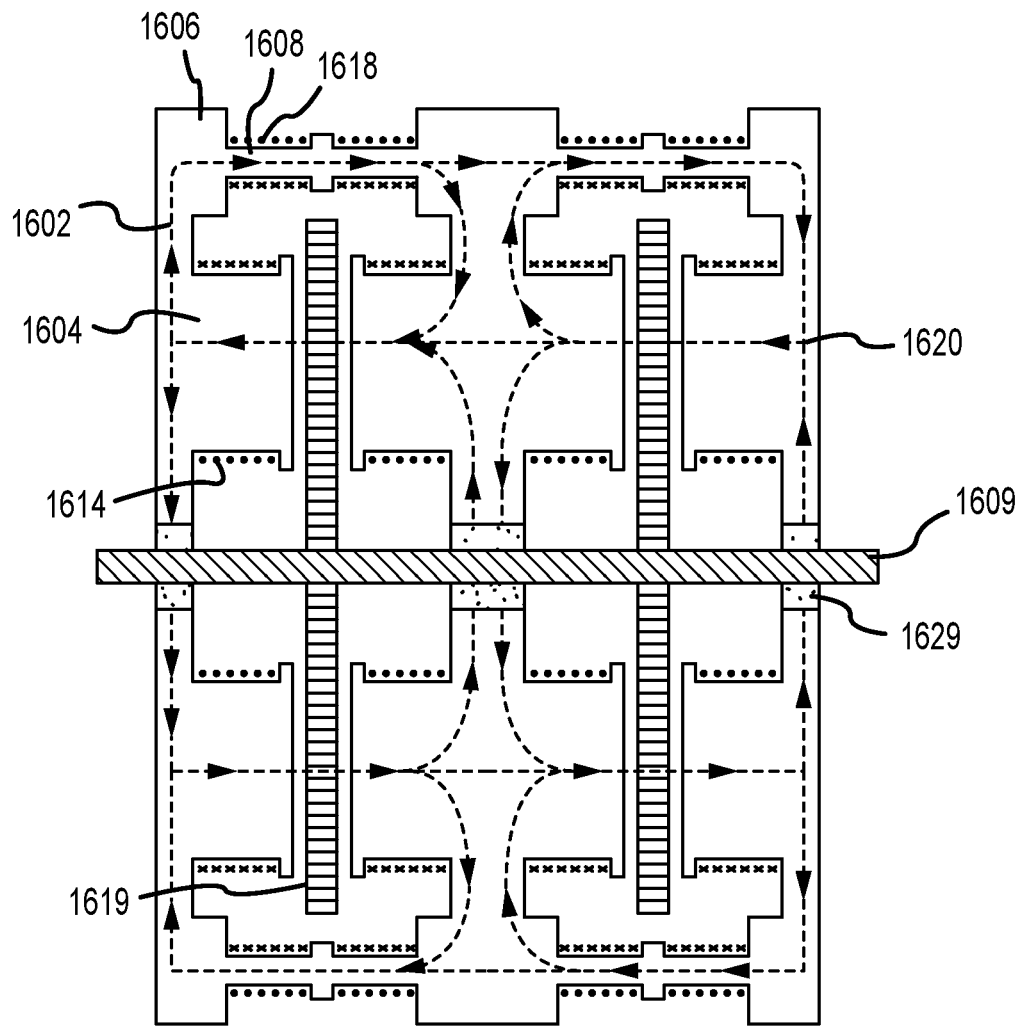
FIG. 16 shows an example of a cross-sectional view of a tri-stator axial flux induction machine structure.

As noted earlier, more than two stators and more than one rotor can be implemented. For instance, FIG. 16 illustrates an embodiment of an axial flux induction machine having three stator cores and two rotors. This cross-sectional view may represent an interior of FIG. 15. Along these same lines, other embodiments may include any number of stator cores (S) with the number of rotors (R) being one less than the number of stator cores, following the equation R=S−1. The stators may be coupled together at the outer ring 1608 and can be centered around an axis of rotation through which a shaft 1609 passes; however, in some embodiments, a gap or short distance may separate each of the stators. The rotors 1619 are centered around and configured to rotate about this axis of rotation, and the rotors 1619 are coupled to the shaft 1609 to, thereby, rotate when the rotors 1619 rotate. Each stator may be coupled to the shaft via one or more bearings 1629, which may be constructed of low-permeable material to avoid magnetic field interactions that may cause additional friction; however, in other embodiments, the stators may not be directly coupled to the shaft 1609.

In FIG. 16, the outer two stators are coupled to the shaft 1609 via bearings 1629, while the central stator is not directly coupled to the shaft 1609 and leaves a gap around the shaft 1609. Not directly coupling to the shaft 1609 enables the central stator to reduce the energy lost to friction, increasing the overall efficiency of the axial flux induction machine. In other embodiments, this reduction in energy lost to friction becomes magnified as the number of central stators increases, making the efficiency increase even more significant (i.e., regardless of the number of stators, only two need to be coupled to the shaft 1609 via bearings, and in some cases, only a single stator need be coupled to the shaft 1609 via bearings). In some embodiments the shaft 1609 may be constructed of low-permeability material, avoiding possible interference with the axial flux induction machine performance.

In FIG. 16, each stator has an inner ring of high-permeability structures 1604 and an outer ring of high-permeability structures 1608, which are arranged further from the axis of rotation than the inner ring of high-permeability structures 1604. The high-permeability structures of the outer stators extend axially towards the central stator, while the high-permeability structures of the central stator extend in both axial directions towards the outer stators. The inner coils 1614 are wrapped around the inner ring structures 1604, and the outer coils 1618 are wrapped around the outer ring structures 1608. The inner ring structures 1604 protrude from each stator core base 1602, while the outer ring structures 1608 protrude from a raised lip 1606, which may have a curved or angled edge. In some embodiments, the raised lip 1606 may not be present, and the outer ring structures 1608 may protrude directly from each stator core base 1602. The protrusion height and thickness of the inner ring structures 1604 and outer ring structures 1608 can be adjusted to accommodate different sizes of coils, which may vary according to power requirements. Space is left between the inner ring structures 1604 to enable the rotors to rotate without contacting the stators. The distance, measured axially, between the outer ring of high-permeability structures 1608 on adjacent stators is less than the distance between the inner ring of high-permeability structures 1604 on the same stators, and in some embodiments the distance between outer ring structures 1608 may be zero.

The outer ring structures 1608 have an inner radius as measured from the rotation axis that is greater than an outer radius of the rotor 1619. However, in other embodiments where there is a gap between the outer ring structures 1608 of opposing stators, the outer ring structures 1608 may have an inner radius that is less than an outer radius of the rotor, but an outer radius that is greater than an outer radius of the rotor.

The inner ring structures 1604 and outer ring structures 1608 have an upper lip that enables them to further secure coils in place, but this lip may not be present in other embodiments. Also, the inner ring structures 1604 and outer ring structures 1608 may each provide support for a single coil or a layered coil model. Furthermore, each stator core base 1602, inner ring structure 1604, outer ring structure 1608, and raised lip 1606 may be constructed of one of more high-permeability materials, which enables the amplification of the magnetic field produced by the inner ring coils 1614 and outer ring coils 1618 while producing the magnetic field path 1620. In some embodiments, the inner coils 1614 and outer coils 1618 wrapped around corresponding inner ring structures 1604 and outer ring structures 1608 can be conductively coupled, at least one of in series or in parallel, to form a single conductive path. For instance, FIG. 5 shows inner and outer coils 504 and 508, respectively, coupled in series to form a single conductive path. Additionally, FIG. 6 shows inner and outer coils 604 and 608, respectively, coupled in parallel to form a single conductive path. The single conductive path may have two leads accessible from the axial flux induction machine exterior, after assembly, and can be configured for coupling to an electrical system such as a power source, battery, transformer, A-D or D-A converter, the grid, etc.

In some embodiments, the inner coils 1614 and the outer coils 1618 can be wound around the inner ring structures 1604 and the outer ring structures 1608 in different configurations to achieve different magnetic field paths 1620. In some embodiments, the inner coils 1614 may be wider than the outer coils 1618 to enable the inner coils 1614 to produce a higher magnetic field density. The inner coils 1614 are wrapped in the opposite direction of the corresponding outer coils 1618 of each stator to achieve the magnetic field path 1620, which can form a semi-toroidal magnetic field configuration. This semi-toroidal magnetic field configuration enables the axial flux induction machine to operate more efficiently with a stronger magnetic field for a given amount of power. Additionally, a reduced or zero distance between the outer ring structures 1608 enables a reduction in the gap space that the majority of the magnetic field path 1620 experiences. This reduction in gap space can result in a more efficient magnetic field characterized by minimized leakage flux. The efficiency benefits of the semi-toroidal magnetic field configuration and the reduced gap space enable the axial flux induction machine to have a reduced size for a given operating power.

In some embodiments of the present disclosure, the axial flux machine can act as at least one of a motor or a generator. When the axial flux machine is acting as a motor, electrical current may be provided to the stator coils to produce a RMF, which interacts with the rotor structure, resulting in mechanical rotary motion of the rotor structure and shaft. This mechanical motion of the shaft may be utilized to provide mechanical rotary energy to a system. When the axial flux machine is acting as a generator, an excitation current can be applied such as to produce a magnetic field on the rotor via preexisting methodologies, and the rotor structure may be spun at above synchronous speed such as to produce voltage across the stator coil windings. This induced stator voltage can then be fed back into the grid as useable generated power. Because of the semi-toroidal shape of the generator stator coils, the magnetic field induced in the stator structures by the rotor structure may interact with more coils, thus producing higher voltage at the output. This increased voltage may correspond with higher potential power output than traditional axial flux induction machines, thus improving power density and efficiency. The semi-toroidal shape also enables reduced leakage flux from the generator, producing another efficiency advantage.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An axial flux machine comprising:
   an axis of rotation;
   a rotor centered around and configured to rotate around the axis of rotation;
   a shaft passing through the axis of rotation and coupled to the rotor thereby rotating when the rotor rotates;
   a first stator and second stator each centered around the axis of rotation and arranged on opposing sides of the rotor, each of the first and second stators comprising:
      an inner ring of high-permeability structures extending towards the rotor; and
      an outer ring of high-permeability structures arranged further from the axis of rotation than the inner ring and extending towards the rotor, and wherein the inner and outer rings of high-permeability structures are substantially parallel to the axis of rotation;
   a plurality of inner conductive coils wrapped around one or more of the high-permeability structures in the inner ring; and
   a plurality of outer conductive coils wrapped around one or more of the high-permeability structures in the outer ring.

2. The axial flux machine of claim 1, wherein one of the plurality of inner conductive coils is coupled to one of the plurality of outer conductive coils to form a first conductive path.

3. The axial flux machine of claim 2, wherein the first conductive path has at least two leads accessible from an exterior of the axial flux machine and configured for coupling to an electrical system.

4. The axial flux machine of claim 3, further comprising a transformer and a second conductive path, and wherein:
   the inner and outer conductive coils of the first stator are coupled to form the first conductive path,
   the inner and outer conductive coils of the second stator are coupled to form the second conductive path,
   the electrical system comprises an alternating current (AC) electrical system, and
   the second conductive path comprises at least two leads accessible from the exterior of the axial flux machine and configured to couple to an electrical load.

5. The axial flux machine of claim 4, wherein at least one of:
   a number of inner conductive coils wrapped around one or more of the high-permeability structures in the inner ring of the first stator is different from a number of inner conductive coils wrapped around one or more of the high-permeability structures in the inner ring of the second stator; and
   a number of outer conductive coils wrapped around one or more of the high-permeability structures in the outer ring of the first stator is different from a number of outer conductive coils wrapped around one or more of the high-permeability structures in the outer ring of the second stator.

6. The axial flux machine of claim 2, further comprising a second conductive path, wherein the first and second conductive paths have at least two leads accessible from an exterior of the axial flux machine and configured for coupling to an electrical system.

7. The axial flux machine of claim 1, wherein corresponding ones of the outer ring of high-permeability structures between the two stators are closer to each other measured parallel to the axis of rotation than corresponding ones of the inner ring of high-permeability structures between the two stators measured parallel to the axis of rotation.

8. The axial flux machine of claim 1, wherein the outer ring of high-permeability structures on the first stator is in contact with the outer ring of high-permeability structures on the second stator.

9. The axial flux machine of claim 1, further comprising at least three stators and two rotors, wherein one of the stators is arranged between the two rotors and has inner and outer rings of high-permeability structures and corresponding inner and outer conductive coils extending in both directions parallel to the axis of rotation.

10. The axial flux machine of claim 9, wherein at least two of the stators couple to the shaft via bearings, and wherein another of the stators is not in contact with the shaft.

11. The axial flux machine of claim 1, wherein each inner conductive coil is wrapped around one or more of the high-permeability structures in the inner ring and each outer conductive coil is wrapped around one or more of the high-permeability structures in the outer ring.

12. The axial flux machine of claim 1, wherein:
a number of inner conductive coils wrapped around one or more of the high-permeability structures in the inner ring of at least one of the first stator and the second stator is different from a number of outer conductive coils wrapped around one or more of the high-permeability structures in the outer ring of the at least one of the first stator and the second stator.

13. An axial flux machine comprising:
an axis of rotation;
a rotor centered around and configured to rotate around the axis of rotation;
a shaft passing through the axis of rotation and coupled to the rotor thereby rotating when the rotor rotates;
a first stator and second stator each centered around the axis of rotation and arranged on opposing sides of the rotor, each of the first and second stators comprising:
an inner means for retaining one or more inner conductive coils; and
an outer means for retaining one or more outer conductive coils, the outer means arranged further from the axis of rotation than the inner means, and wherein the inner and outer means for retaining the one or more inner and outer conductive coils, respectively, extend towards the rotor and are substantially parallel to the axis of rotation; and
one of the one or more of inner conductive coils connected to one of the one or more outer conductive coils to form a first conductive path.

14. The axial flux machine of claim 13, wherein the first conductive path has two leads accessible from an exterior of the axial flux machine.

15. The axial flux machine of claim 13, further comprising a second conductive path, wherein the first and second conductive paths have at least two leads accessible from an exterior of the axial flux machine and configured for coupling to an electrical system.

16. The axial flux machine of claim 13, wherein the outer means of the first stator is closer to the outer means of the second stator than the inner means of the first stator is to the inner means of the second stator.

17. The axial flux machine of claim 13, wherein the outer means for retaining the one or more outer conductive coils for the first stator is in contact with the outer means for retaining the one or more outer conductive coils for the second stator.

18. The axial flux machine of claim 16, wherein the outer coils of one of the one or more outer conductive coils of the first stator are in contact with outer coils of one of the one or more outer conductive coils of the second stator.

19. The axial flux machine of claim 13, wherein the axial flux machine is configured to receive power from the electrical system that is then converted to rotation of the rotor.

20. The axial flux machine of claim 13, wherein the axial flux machine is configured to convert rotation of the rotor into electricity that is sent to the electrical system.

21. The axial flux machine of claim 13, wherein an inner radius of the outer means as measured from the axis of rotation is greater than an outer radius of the rotor as measured from the axis of rotation.

22. An axial flux machine comprising:
an axis of rotation;
a rotor centered around and configured to rotate around the axis of rotation;
a shaft passing through the axis of rotation and coupled to the rotor thereby rotating when the rotor rotates; and
a first stator and second stator each centered around the axis of rotation and arranged on opposing sides of the rotor, each of the first and second stators comprising:
an inner ring of high-permeability structures wrapped in a first set of conductive coils and extending toward the rotor and arranged a first radius from the axis of rotation; and
an outer ring of high-permeability structures wrapped in a second set of conductive coils and extending toward the rotor and arranged a second radius from the axis of rotation, the second radius greater than the first radius, and wherein the inner and outer rings of high-permeability structures extend towards the rotor and are substantially parallel to the axis of rotation.

23. The axial flux machine of claim 22, wherein the first set and the second set of conductive coils are in electrical communication.

24. The axial flux machine of claim 23, wherein there are at least two leads for the first set and the second set of conductive coils, the two leads accessible from an outside of the axial flux machine.

25. The axial flux machine of claim 22, wherein a first gap between the outer ring of high-permeability structures of the first and second stators is smaller than a second gap between the inner ring of high-permeability structures of the first and second stators.

26. The axial flux machine of claim 22, wherein the outer ring of high-permeability structures on the first stator is in contact with the outer ring of high-permeability structures on the second stator.

27. The axial flux machine of claim 26, wherein the second set of conductive coils of the first stator is in contact with the second set of conductive coils of the second stator.

28. The axial flux machine of claim 22, wherein each of the first set of conductive coils is wrapped around one or more of the high-permeability structures in the inner ring and each of the second set of conductive coils is wrapped around two or more of the high-permeability structures in the outer ring.

* * * * *